Patented Jan. 4, 1949

2,458,295

UNITED STATES PATENT OFFICE 2,458,295

PRODUCTION OF VANILLIC ACID

Irwin A. Pearl, Appleton, Wis., assignor, by mesne assignments, to Sulphite Products Corporation, Appleton, Wis., a corporation of Wisconsin No Drawing. Application May 17, 1944,
Serial No. 536,041

2 Claims. (Cl. 260—521)

The present invention relates to the production of vanillic and closely related acids, and to an improved process for producing acids derived by oxidation from vanillin, ortho-vanillin, syringaldehyde, and related compounds.

Most aldehydes may be transformed to the corresponding acids by common oxidizing agents or in the Cannizzaro reaction, but vanillin, ortho-vanillin, and syringaldehyde are exceptions and have been reported as not amenable to either reaction. Ordinary oxidizing agents either (1) have no action on the compound or (2) acts as dehydrogenating agents, and yield the dehydrodicompound or (3) cause complete decomposition.

The Cannizzaro reaction is conveniently written as follows:

It will be be seen that one molecule of aldehyde is reduced and the other one oxidized to generate equal parts of the derived acid, which equal parts can be readily separated. I have discovered that vanillin can be quantitatively and easily transformed to vanillic acid by treating it with silver oxide in hot solution with excess alkali.

An example according to the invention involves the following simultaneous reactions:

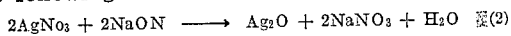
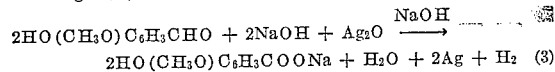

*Example I*

To 400 parts of water, 48 parts (1.2 mole) sodium hydroxide was added with vigorous stirring, and 30.4 parts (0.2 mole) of vanillin. The heat of solution raised the temperature to about 55° C. If it does not, heat should be supplied to bring the temperature to above 50° C. With continued agitation, 34 parts (0.2 mole) of silver nitrate, previously dissolved in 150 parts of water, were added by pouring it slowly into the solution a little at a time. For about a minute after pouring started, a granular brownish black powder seemed to be present. Then the mixture turned milky, and reaction started and the silver oxide was instantaneously decolorized to produce a fluffy, spongy metallic silver which had a gray color in the solution. The heat of reaction raised the temperature to about 85° C., and after all the silver nitrate was added, the mixture was heated to boiling briefly, allowed to cool a little, and filtered, as through a sintered glass funnel.

The alkaline filtrate was adicified, with sulfur dioxide, and yielded a thick white cyrstalline precipitate which was identified as pure vanillic acid having a sharp melting point at 210—211° C.

The acidification precipitated about 93% of the vanillic acid, and an additional 7% was secured by ether extraction of the acid solution. The total yield represented 100% of the vanillin originally used.

Ortho-vanillin and syringaldehyde reacted in the same way as the ordinary (para) vanillin, with similar high yields of completely transformed material. Acids which have no reducing action, such as sulfuric acid or acetic acid, tend to form nitrated compounds such as 5-nitro-vanillic acid and 4,6-dinitroguaiacol, but the reducing action of sulfurous acid avoids any such contingency.

The precipitated silver had an apparent density of about 0.26 and when permitted to dry in air it was so active that it became spontaneously heated above its melting point and fused into a ball. This silver appears to have great catalytic power as further disclosed in my co-pending application, Serial No. 536,040, filed May 17, 1944, now abandoned.

The oxidation of the aldehyde to the derived acid is equally efficient if the ingredients are mixed at room temperature and then warmed. Under such circumstances the mixing of the ingredients forms the precipitate of silver oxide which is not decomposed until the temperature is raised to about 50° C. At that time the reaction starts with an evolution of heat that will raise the temperature of the mass by an amount depending upon the dilution of the mixture. Such a procedure gives the same vanillic acid product, but the metallic silver obtained is less finely divided and of less catalytic power than that obtained when the mixing of the ingredients takes place at temperatures not lower than about 50° C.

Without further elaboration the foregoing will so fully explain my invention that others may readily adapt the same for use under various conditions of service.

I claim:

1. The method of preparing vanillic acid from vanillin represented by the formula:

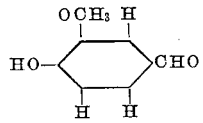

which comprises adding a solution of a soluble silver salt containing one weight atom of silver to a solution already containing one mole of vanillin and an excess of alkali at a temperature of at least about 50° C.; whereby silver oxide is generated in a nascent condition in the presence of the vanillin and alkali, by which it is immediately reduced; and acidifying with sulfur dioxide to precipitate vanillic acid.

2. The method of preparing the derived monocarboxylic acid from an aromatic aldehyde selected from the class, vanillin, ortho-vanillin and syringaldehyde, which comprises adding a solution of silver nitrate that contains one weight atom of silver to a solution already containing one mole of the aldehyde and an excess of alkali at a temperature of at least about 50° C.; whereby silver oxide is generated in a nascent condition in the presence of the aldehyde and alkali, by which it is immediately reduced; and acidifying with sulfur dioxide to precipitate the acid.

IRWIN A. PEARL.

REFERENCES CITED

The following references are of record in the file of this patent:

Tiemann, "Berichte," vol. 8, p. 1123 (1875).
Cinamican et al., "Berichte," vol. 38, p. 3821 (1905).
Brunne et al., "Journal fur Practische Chemie" (2), vol. 77, page 29 (1908).
Hale, "Synthetic Use of Metals," pp. 41, 128, 129 (1914).
Dinelli, "Annali di Chimica Applicata," vol. 29, pages 448–451 (1939).